United States Patent Office 3,418,266
Patented Dec. 24, 1968

3,418,266
WATER REPELLENT COMPOSITIONS
John M. Nielsen, Burnt Hills, N.Y., assignor to General Electric Company, a corporation of New York
No Drawing. Filed July 29, 1964, Ser. No. 386,076
7 Claims. (Cl. 260—33.8)

ABSTRACT OF THE DISCLOSURE

Organopolysiloxane compositions are provided which are useful for rendering fabrics water repellent, comprising an organohydrogenpolysiloxane, and an organometallic ester, such as a titanium alkoxide. The organopolysiloxane compositions can contain a glycol stabilizing agent for the organometallic ester. The organopolysiloxane compositions also can employ organohydrogenpolysiloxane having terminal diorganohydrogen siloxy units.

---

The present invention relates to organopolysiloxane compositions useful for rendering fabrics water repellent. More particularly, the present invention relates to a curable composition comprising an organopolysiloxane having chemically combined hydrogen substituted siloxy units, an organometallic curing agent, and an organic solvent.

Organopolysiloxane compositions have been employed to render porous substrates water repellent. Significantly improved results have been achieved by utilizing methylhydrogenpolysiloxane compositions in combination with organometallic compounds such as shown by Cockett et al., Patent 2,774,690.

Experience has shown that while such organic solvent solutions of methylhydrogenpolysiloxane and organometallic compounds can provide for effective results, such solutions can either badly discolor or become contaminated with insoluble organometallic hydrolysis products. For example, it has been found that precipitation of organometallic materials from such treating solutions can be effected within 24 hours after fabric has been immersed in the treating bath in accordance with conventional dry cleaning plant operations. Precipitation of such organometallic materials impair the appearance and effectiveness of the treating bath as well as the appearance and water repellent characteristics of the treated fabric.

Those skilled in the dry cleaning art know that when utilizing such organohydrogenpolysiloxane-organometallic solutions, precipitation of organometallic hydrolysis products from the bath can be avoided by spraying the fabric with fresh treating solution instead of immersing it into the bath. However, the problem of discoloration of the bath, i.e., the change in the color of the bath from a pale yellow color to an unsightly dark blue, or black, has resisted such efforts. In addition, even though the employment of spray techniques have been found to minimize the problem of organometallic precipitation, at the present time spraying is not employed as extensively in dry cleaning plant operations as immersing.

It has now been discovered that if certain glycols are incorporated in organohydrogenpolysiloxane baths containing organometallic compounds, fabrics can be dipped into the bath over a period of several months without effecting the precipitation of organometallic materials. In addition, it also has been found that the problem of bath discoloration can be substantially reduced by utilizing as the source of organohydrogensiloxy units in the treating solution, organohydrogenpolysiloxane consisting essentially of chemically combined organosiloxy units of the formula, (1) $(R)_a(H)_bSiO_{\frac{(4-a-b)}{2}}$ included among the chemically combined siloxy units having hydrogen attached to silicon of said organohydrogenpolysiloxane are at least 50 mole percent of terminal diorganohydrogensiloxy units of the formula, (2) $(R)_2HSiO_{0.5}$ where R is selected from monovalent hydrocarbon radicals and halogenated monovalent hydrocarbon radicals, $a$ is an integer equal to 1 to 3, and $b$ is a whole number equal to 0 or 1; said organohydrogenpolysiloxane has a ratio of R radicals per silicon atom which has a value from about 1.7 to 2, inclusive, and a ratio of the sum of the R radicals and hydrogen per silicon atom which has a value of about 2.005 to 2.6, inclusive.

There is provided by the present invention, a treating composition comprising (1) an organic solvent, and (2) a curable mixture selected from, (A) a mixture consisting essentially of by weight, (a) 100 parts of an organohydrogenpolysiloxane consisting essentially of chemically combined organosiloxy units of Formula 1, of which there is included among the siloxy units having hydrogen attached to silicon of said organohydrogenpolysiloxane, at least 50 mole percent of terminal diorganohydrogensiloxy units of Formula 2, to provide in said organohydrogenpolysiloxane for a ratio of R radicals per silicon atom having a value of from about 1.7 to 2, inclusive, and a ratio of the sum of R radicals and hydrogen per silicon atom having a value of from 2.005 to 2.6, inclusive, and (b) from 10 to 100 parts of an organometallic ester having the formula, (3) $M(OR')_x$ and (B) a mixture comprising by weight (a) 100 parts of an organohydrogenpolysiloxane having the formula, (4) $(R)_cH_dSiO_{\frac{(4-c-d)}{2}}$ (b) 11 to 150 parts of a curing agent produced by mixing the organometallic ester of Formula 3, and 0.2 to 1 mole, per mole of said organometallic ester of a glycol having the formula, (5) $HOCR''_2-CR''_2-CR''_2OH$ where in said treating composition, there is utilized from 5 to 100 parts of said organic solvent per part of said curable mixture, M is a metal selected from titanium, aluminum, and zirconium, $x$ is an integer having a value equal to the valence of M, R is defined above, R' is an alkyl radical, R'' is selected from hydrogen, R and $(CH_2)_nOR$, where $n$ is an integer equal to 1 to 8, inclusive, $c$ has a value between 1.7 to 2.0, inclusive, $d$ has a value between .005 to 1, inclusive, and the sum of $c$ and $d$ has a value between 2.005 to 2.6, inclusive.

Radicals included by R of Formulae 1 and 2 can be all the same or they can be different. Radicals included by R are preferably alkyl or cycloalkyl such as methyl, ethyl, propyl, butyl, cyclohexyl, etc. R also can include alkenyl such as vinyl, allyl, etc. In addition, R also can include minor amounts of aryl and haloaryl such as phenyl, chlorophenyl, etc., R' includes the alkyl radicals defined previously by R. R'' includes all the preceding R radicals, and radicals such as methoxymethyl, methoxyethyl, ethoxyethyl, etc. Preferably, the R radicals included by Formula 1 are at least 70 mole percent alkyl, based on the total R radicals.

Included by the organometallic esters of Formula 3, are aluminum alkoxides such as isopropyl aluminate, isobutyl aluminate, 2-ethylhexylaluminate, n-octyl aluminate, etc.; zirconium alkoxides such as methyl zirconate, ethyl zirconate, isopropyl zirconate, n-butyl zirconate, etc.; titanium alkoxides, such as methyl titanate, ethyl titanate, propyl titanate, butyl titanate, isopropyl titanate, isobutyl titanate, etc. Mixtures of such esters also can be employed.

The preparation of the above organometallic esters of Formula 4 is well known to the art. For example, the corresponding metal halide, such as titanium tetrachloride, aluminum trichloride, zirconium tetrachloride, etc. can be reacted with aliphatic alcohol in the presence of an acid acceptor such as amine catalyst, or an alkoxy exchange reaction can be employed. Secondary aliphatic alcohols can be employed, such as isopropyl alcohol, isobutyl alcohol, 2-ethylhexyl alcohol, etc. Primary alcohols, such as methyl alcohol, ethyl alcohol, etc. as well as tertiary aliphatic alcohols also are operable.

Included by the glycols shown by Formula 5 are for example, 1,3-diols which are at least disubstituted in 2 and 3 positions. These glycols preferably have 5 to 20 carbon atoms such as pentylene glycols, octylene glycols, decylene glycols, etc. Glycols that are included for example, are 2-ethyl-1,3-hexanediol, 2,2,4-trimethyl-1,3-pentanediol, 2-methyl-2,4-pentanediol, etc. In addition to glycols included by Formula 5, materials such as the dodecylene glycols, and compounds such as monoallylether of 1,1,1-trimethylolpropane, 2,4-diphenyl-1,3-butanediol, and similar materials also can be utilized.

The organohydrogenpolysiloxane that can be employed in the practice of the invention can be made by hydrolyzing hydrohalosilane included by the formula, (6) $(R)_e HSiX_{3-e}$ or cohydrolyzing such hydrohalosilane with silanes of the formula, (7) $(R)_f SiX_{4-f}$ where R is defined above, X is a halogen radical such as chloro or bromo, $e$ is a whole number equal to 0 to 2, inclusive, and $f$ is an integer equal to from 0 to 3, inclusive.

Hydrohalosilanes included by Formula 6 are for example, trichlorosilane, methyldichlorosilane, dimethylchlorosilane, ethyldichlorosilane, etc. Silanes included by Formula 7 are for example, methyltrichlorosilane, ethyltrichlorosilane, dimethyldichlorosilane, methylvinyldichlorosilane, dimethylvinyldichlorosilane, methylphenyldichlorosilane, tetrachlorosilane, etc.

Preferably, the organohydrogenpolysiloxane of the present invention consists essentially of chemically combined diorganosiloxy units included by Formula 1, and terminated with diorganohydrogensiloxy units of Formula 2. Optimum water repellency is achieved if such organohydrogenpolysiloxane is utilized in combination with a titanate ester included by Formula 3. In addition, the organohydrogenpolysiloxane utilized in the practice of the invention can be employed in combination with organopolysiloxane free of hydrogen attached to silicon. A mixture, for example, containing up to about 0.5 part of organopolysiloxane, consisting essentially of chemically combined diorganosiloxy units of Formula 1 and terminated with triorganosiloxy units, per part of organohydrogenpolysiloxane of the invention also can provide for effective results.

Organic solvents that can be utilized in the practice of the invention to make the treating composition include for example, carbontetrachloride, trichloroethylene, perchloroethylene, Stoddard solvent, mineral spirits, heptane, toluene, xylene, etc.

The organohydrogenpolysiloxane of the present invention also can be made by conventional equilibration procedures by utilizing cyclic diorganopolysiloxanes such as octamethylcyclotetrasiloxane, or such cyclic organopolysiloxanes containing at least one siloxy unit having hydrogen attached to silicon along with chain-stopping units as hexamethyldisiloxane, tetramethyldisiloxane, or other chain-stopping units generated by chlorosilane of Formula 6 or 7. The organohydrogenpolysiloxane of the present invention can have a viscosity in the range of from 5 centtipoises to as high as 10,000 centipoises at 25° C., and preferably from 10 to 500 centipoises. In instances where the organohydrogenpolysiloxane is a methylhydrogenpolysiloxane in which the siloxy units having hydrogen attached to silicon is exclusively in the form of chain-stopping units of Formula 2, it is preferred to utilize a viscosity of from 10 to 150 centipoises at 25° C.

The organohydrogenpolysiloxane of the invention can contain up to 1.66% by weight of hydrogen attached to silicon, based on the weight of organohydrogenpolysiloxane. In instances where the organohydrogenpolysiloxane has chemically combined siloxy units having hydrogen attached to silicon of which at least 50 mole percent, based on the total moles of such siloxy units in said organohydrogenpolysiloxane, is in the form of units of Formula 2, there can be employed from 0.01 percent to 1.0 percent by weight, and preferably 0.03 percent to 0.3 percent by weight of hydrogen based on the weight of organohydrogenpolysiloxane.

The treating composition of the present invention can be prepared by merely mixing together the organohydrogenpolysiloxane, the organometallic ester, the glycol and the organic solvent.

Depending upon whether the dry cleaning plant provides for either a spray or an immersion type treatment, the choice of the materials utilized in making the treating composition can vary. For example, if a spray treatment is feasible, a treating composition can be employed free of glycol, utilizing an organohydrogenpolysiloxane composed of units of Formula 1, and hydrogen siloxy units of which at least 50 mole percent are shown by Formula 2, in combination with a titanate ester and organic solvent. If desired, an organometallic ester of Formula 3, in combination with an organohydrogenpolysiloxane of Formula 4, and optionally with glycol, also can be effectively utilized in combination with a suitable organic solvent.

In instances where an immersion type of treatment is employed, desirable results can be achieved if an organometallic ester as shown by Formula 3 is utilized in combination with the organohydrogenpolysiloxane of Formula 4, a glycol included by Formula 5, and an organic solvent. The incorporation of the glycol into the mixture can be accomplished in any convenient manner as long as it is done prior to or immediately after the immersion of the fabric into the treating composition. If desired, a preform of the mixture of gylcol and organometallic ester can be used.

Contact between fabric and the treating composition of the present invention can be achieved by dipping, spraying, brushing, etc. After the fabric has been treated, it has been found desirable to heat it to a temperature in the range of between 104° F. to 248° F., and preferably 140° F. to 212° F. to effect the removal of excess solvent as well as effect the cure of the organohydrogenpolysiloxane. The cure of the treated fabric can be accomplished by such means as passing it through a heated chamber, exposing it to infrared radiation, etc.

In order that those skilled in the art will be better able to practice the invention, the following examples are given by way of illustration and not by way of limitation. All parts are by weight.

Example 1

Cotton fabric is immersed into a treating composition consisting of 2 parts of methylhydrogenpolysiloxane, 1 part of tetra(isopropyl)titanate, 0.15 part of 2-ethyl-1,3-hexanediol, and 47 parts of perchloroethylene. The methylhydrogenpolysiloxane has a viscosity of 67.5 centipoises at 25° C., and consists of 0.42 percent by weight of hydrogen attached to silicon, based on the weight of methylhydrogenpolysiloxane. The fabric is immersed and agitated in the bath for 30 seconds before it is removed. After immersion, the treated fabric is allowed to drain for 5 minutes, extracted for 15 seconds, and then cured at 160° F. in a commercial tumble dryer. Two additional samples of cotton fabric are also separately treated in a similar manner.

The above procedure is repeated except that no 2-ethyl-1,3-hexanediol is utilized in the treating bath. The treated cotton fabric is tested for water repellency. A spray rating test is employed following Standard Test Method 22–1952, of American Society of Textile Chemists and Colorists. In addition to the aforementioned spray rating test, a sample from each treating bath is poured into a vial and sealed. These samples are observed over a four month period.

The spray ratings of the treated cotton fabrics and the stabilities of the treating solutions are shown in Table I. "Glycol" indicates the use of 2-ethyl-1,3-hexanediol in the treating bath. "Ppt." shows the formation of insoluble hydrolysis product in the treating bath.

TABLE I

| Glycol | Spray Rating | Shelf Period (days) | | |
|---|---|---|---|---|
| | | 1 | 2 | 120 |
| Yes | 80+ | Clear | Clear | Clear. |
| No | 80+ | Hazy | Ppt | |

Example 2

A treating composition, "A" is prepared by mixing together 2 parts of a methylhydrogenpolysiloxane, 1 part of tetra(isopropyl)titanate and 15 parts of perchloroethylene. The methylhydrogenpolysiloxane has a viscosity of 75 centipoises at 25° C. and is composed of chemically combined methylhydrogensiloxy units and chain-stopped with trimethylsiloxy units.

In addition to A, a similar composition "B" is prepared containing the same components except that in place of the methylhydrogenpolysiloxane of A there is utilized an equal weight of a methylhydrogenpolysiloxane having a viscosity of 100 centipoises at 25° C., composed of chemically combined dimethylsioloxy units and chain-stopped with dimethylhydrogensiloxy units.

Compositions A and B are sprayed on squares of standard raincoat fabric. The treated fabric is then extracted for 15 seconds, and cured at 160° F. in a tumble dryer. In addition, samples of composition A and B are placed in vials which are sealed and observed for several days. Table II below shows the spray ratings, and "Feel" of the treated fabrics, as well as the color of the treating compositions. As indicated above, composition A consists essentially of chemically combined

uints, while the siloxy units of composition B having hydrogen attached to silicon, are in the form of

units.

TABLE II

| Feel | Spray Rating | Color of Compositions | | |
|---|---|---|---|---|
| | | 1 Hr. | 4 Days | 8 Days |
| A, Stiff | 70 | Yellow | Green | Black. |
| B, Soft | 90 | Straw | Straw | Straw. |

Example 3

A composition consisting of 2 parts of a methylhydrogenpolysiloxane consisting essentially of chemically combined methylhydrogensiloxy units and chain-stopped with trimethylsiloxy units, 1 part of tetra(isopropyl)titanate, and 47 parts of perchloroethylene was employed as a treating bath. In addition, similar compositions also were employed utilizing the same components, except that in place of tetra(isopropyl)titanate, there was employed respectively, an equal weight of tri(isobutyl)aluminate and an equal weight of tetra(isopropyl)zirconate.

In addition to the above treating compositions, compositions also were prepared having in place of the trimethylsiloxy chain-stopped methylhydrogenpolysiloxane, a methylhydrogenpolysiloxane consisting essentially of chemically combined dimethylsiloxy units and siloxy units having hydrogen attached to silicon, consisting of at least 50 mole percent of dimethylhydrogensiloxy units. The methylhydrogenpolysiloxane utilized in the various treating compositions had a viscosity of less than 100 centipoises at 25° C.

Standard raincoat fabric was similarly treated with the various compositions by immersion and agitation. The spray ratings of the treated fabric were then determined. Table III below shows the results obtained.

"$(CH_3)_3SiO_{.5}$" signifies the compositions utilizing methylhydrogenpolysiloxane consisting essentially of chemically combined methylhydrogensiloxy units and chain-stopped with trimethylsiloxy units. "$(CH_3)_2HSiO_{.5}$" signifies the compositions containing a methylhydrogenpolysiloxane consisting essentially of chemically combined dimethylsiloxy units and having at least 50 mole percent of the total siloxy units with hydrogen attached to silicon of dimethylhydrogensiloxy units. The symbols for the respective metals indicate the organometallic ester employed in the composition. "Aged" shows spray ratings of the various treated fabrics after a period of several days under atmospheric conditions. Three fabric samples were treated with each of the compositions. The spray rating shown for each composition is the average obtained from the three samples.

TABLE III

| | $(CH_3)_3SiO_{0.5}$ | | |
|---|---|---|---|
| | Ti | Al | Zr |
| Initial | 70 | 70 | 73 |
| Aged | 70 | 73 | 77 |

| | $(CH_3)_2HSiO_{.5}$ | | |
|---|---|---|---|
| | Ti | Al | Zr |
| Initial | 83 | 80 | 70 |
| Aged | 83 | 83 | 83 |

Example 4

A treating composition was prepared by mixing together 2 parts of a dimethylpolysiloxane chain-stopped with dimethylhydrogensiloxy units having a viscosity of about 100 centipoises at 25° C., 1 part of tetra(isopropyl)titanate, 0.15 part of 2,2,4-trimethyl-1,3-pentanediol and about 25 parts of mineral spirits. Standard raincoat fabric was immersed into the treating bath and agitated in the bath for about 30 seconds, allowed to drain for about 5 minutes, extracted, and cured to a temperature of 180° F. The treated fabric was then allowed to stand for about 5 days. The fabric was tested for water repellency by the spray rating method and it was found to have a spray rating of 100. Similar results were obtained with the same treating composition except that in place of mineral spirits, there was utilized respectively, Stoddard solvent and perchloroethylene. In addition, a spray rating of 100 also was obtained when monoallylether of 1,1,1-trimethylolpropane was substituted for the 2,2,4-trimethyl-1,3-pentanediol. It also was observed that the various treating solutions did not discolor. In addition, a sample of the various treating solutions which had been allowed to stand for several weeks under sealed conditions did not form any precipitates. These solutions had been employed in repeated dry cleaning operations for several days. In addition to the raincoat fabric utilized in the aforementioned test, various fabrics including cellulose acetate, asbestos, wool, gabardine, nylon, also were found to have superior water repellency when immersed in the above-described treating compositions following the same treating procedure.

Based on the above results shown in Tables I to III, and the examples, one skilled in the art would know that the treating compositions of the present invention provide for significant advantages over the treating compositions of the prior art. For example, Table I shows that the employment of a 1,3-glycol, in a treating bath containing an organometallic ester, and a methylhydrogenpolysiloxane serves to stabilize the bath. Those skilled in the art know that precipitation of organometallic hydrolyzates in such a treating bath can impair the appearance and effectiveness of the bath, as well as ruin fabrics being treated.

In Table II the advantages achieved by utilizing a methylhydrogenpolysiloxane having at least a major proportion of the hydrogen attached to silicon in the form of chemically combined terminal diorganohydrogensiloxy units is clearly illustrated. For example, a manufacturer of such a composition would know it would be more appealing to dry cleaners. Such treating compositions resist change in color. In addition, superior water repellent properties as well as feel are imparted to treated fabrics.

Further evidence of the superiority of treating composition containing methylhydrogenpolysiloxane having at least 50 mole percent of the hydrogen attached to silicon in the form of terminal units, is shown in Table III. Table III clearly indicates the superior spray rating achieved by the employment of such dimethylhydroxysiloxy terminated polydimethylsiloxanes.

While the foregoing examples have been limited to only a few of the very many variables within the scope of the present invention, it should be understood that the present invention is directed to treating compositions useful for imparting water repellency to various fabrics, comprising organohydrogenpolysiloxane consisting essentially of chemically combined organosiloxy units of Formula 1, of which 50 mole percent of the siloxy units having hydrogen attached to silicon are shown by Formula 2 or organohydrogenpolysiloxane shown by Formula 4, an organometallic ester of Formula 3 and organic solvent. When the compositions of the present invention are used in certain treating methods, the compositions also can include glycols of Formula 5.

What I claim as new and desire to secure by Letters Patent of the United States is:

1. A treating composition comprising an organic solvent solution of a curable mixture consising essentially of by weight, (A) 100 parts of an organohydrogenpolysiloxane having a viscosity in the range of from 5 to 10,000 centipoises at 25° C. consisting essentially of chemcially combined organosiloxy units of the formula,

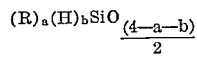

of which there are included among the chemically combined siloxy units having hydrogen attached to silicon of said organohydrogenpolysiloxane, at least 50 mole percent of terminal diorganohydrogensiloxy units of the formula, $(R)_2HSiO_{0.5}$ to provide for a ratio of R radicals per silicon atom of said organohydrogenpolysiloxane having a value of from about 1.7 to 2, inclusive, and a ratio of the sum of the R radicals and hydrogen per silicon atom having a value of from about 2.005 to 2.6, inclusive, and (B) from 11 to 150 parts of a curing agent produced by mixing an organometallic ester having the formula,

and 0.2 to 1 mole, per mole of said organometallic ester, of a glycol having the formula,

where R is a member selected from the class consisting of monovalent hydrocarbon radicals and halogenated monovalent hydrocarbon radicals, R' is an alkyl radical, R" is a member selected from the class consisting of hydrogen, R and $(CH_2)_nOR$, where $n$ is an integer equal to 1 to 8, inclusive, M is a metal selected from the class consisting of titanium, aluminum and zirconium, $x$ is an integer having a value equal to the valence of M, $a$ is an integer equal to 1 to 3, inclusive, and $b$ is a whole number equal to 0 or 1.

2. A composition in accordance with claim 1 where said organometallic ester is an organoaluminate.

3. A composition in accordance with claim 1 where said organometallic ester is an organozirconate.

4. A treating composition in accordance with claim 1 comprising an organic solvent solution of a curable mixture consisting essentially of by weight, (A) 100 parts of a methylhydrogenpolysiloxane having a viscosity of from 5 to 10,000 centipoises at 25° C. consisting essentially of chemically combined methyl siloxy units of the formula, $(CH_3)_2SiO$ and hydrogen-substituted siloxy units of which there are included at least 50 mole percent of siloxy units of the formula, $(CH_3)_2HSiO_{0.5}$ to provide for a ratio in said methylhydrogenpolysiloxane of from about 1.7 to 2 methyl radicals per silicon atom, and a ratio of the sum of said methyl radicals and hydrogen per silicon atom of from 2.005 to 2.6, inclusive, and (B) from 11 to 150 parts of a curing agent produced by mixing an organotitanate having the formula,

and 0.2 to 1 mole, per mole of said organotitanate, of a glycol having the formula,

where R' is an alkyl radical, and R" is a member selected from the class consisting of hydrogen, alkyl and alkoxyalkyl.

5. A treating composition in accordance with claim 4 where said organotitanate is tetra(isopropyl)titanate.

6. A treating composition in accordance with claim 4 where the glycol is 2-ethyl-1,3-hexanediol.

7. A treating composition comprising a perchloroethylene solution of a curable mixture consisting essentially of by weight, (A) 100 parts of methylhydrogenpolysiloxane having a viscosity in the range of from 5 to 10,000 centipoises at 25° C. consisting essentially of chemically combined dimethylsiloxy units and chain-stopped with dimethylhydrogensiloxy units, and (B) from 11 to 150 parts of a curing agent produced by mixing tetra(isopropyl)titanate, and 0.2 to 1 mole, per mole of tetra(isopropyl)titanate of 2-ethyl-1,3-hexanediol.

References Cited

UNITED STATES PATENTS

| | | | |
|---|---|---|---|
| 2,415,389 | 2/1947 | Hunter | 260—462 |
| 2,645,629 | 7/1953 | Nitzsche et al. | 260—46.5 |
| 2,865,918 | 12/1958 | Harwitz | 260—247.5 |
| 3,220,969 | 11/1965 | Wise | 117—135.5 |
| 3,284,391 | 11/1966 | Campbell | 260—33.8 |

FOREIGN PATENTS

| | | |
|---|---|---|
| 586,776 | 11/1959 | Canada. |
| 922,377 | 3/1963 | Great Britain. |
| 1,075,550 | 2/1960 | Germany. |

MORRIS LIEBMAN, *Primary Examiner.*

J. F. CALLAGHAN, *Assistant Examiner.*

U.S. Cl. X.R.

260—33.6, 33.4, 46.5